US008161696B2

(12) United States Patent
Colwell et al.

(10) Patent No.: US 8,161,696 B2
(45) Date of Patent: *Apr. 24, 2012

(54) SLEEVE SYSTEM AND METHOD OF USING

(75) Inventors: Ted D Colwell, Edina, MN (US);
Kristen A. Jensen, St. Paul, MN (US);
Rebecca C. Lee, Eagan, MN (US);
Ernst L. Schmidt, Hager City, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/283,212

(22) Filed: Oct. 27, 2011

(65) Prior Publication Data
US 2012/0036801 A1  Feb. 16, 2012

Related U.S. Application Data

(62) Division of application No. 12/545,331, filed on Aug. 21, 2009, now Pat. No. 8,069,623.

(51) Int. Cl.
E04C 2/52 (2006.01)
(52) U.S. Cl. ...................... 52/220.8; 285/192
(58) Field of Classification Search .............. 52/220.1, 52/220.8, 232; 285/3–4, 55, 62, 192, 193, 285/201, 211
See application file for complete search history.

(56) References Cited

U.S. PATENT DOCUMENTS

| 4,427,173 | A | | 1/1984 | MacKay |
| 4,667,702 | A | | 5/1987 | Roth |
| 4,756,945 | A | | 7/1988 | Gibb |
| 4,936,064 | A | | 6/1990 | Gibb |
| 5,022,685 | A | * | 6/1991 | Stiskin et al. ................ 285/45 |
| 5,079,389 | A | | 1/1992 | Nelson |
| 5,125,199 | A | | 6/1992 | Whitney |
| 5,393,106 | A | | 2/1995 | Schroeder |
| 5,456,050 | A | * | 10/1995 | Ward ...................... 52/220.8 |
| 5,548,934 | A | | 8/1996 | Israelson |
| 5,594,202 | A | | 1/1997 | Tobias |
| 5,661,891 | A | * | 9/1997 | Miller et al. ................ 29/453 |
| 5,729,938 | A | | 3/1998 | Tobias |
| 5,909,904 | A | | 6/1999 | Shea |
| 5,961,154 | A | | 10/1999 | Williams |

(Continued)

FOREIGN PATENT DOCUMENTS

KR    10-0762012    9/2007

(Continued)

OTHER PUBLICATIONS

Abesco CT-120 Technical Data Sheet; May 4, 2004, 2 pages.

(Continued)

*Primary Examiner* — Basil Katcheves
*Assistant Examiner* — Beth Stephan
(74) *Attorney, Agent, or Firm* — Kenneth B. Wood

(57) ABSTRACT

Herein is disclosed a sleeve system and methods of using the system. The system uses an elongated open-ended sleeve, and mounting plate parts which mate with each other to form a mounting plate and which are securable to each other and to a wall. The mounting plate thus formed comprises a collar which, when the mounting plates parts are secured together, presses against portions of the outer surface of the sleeve to hold the sleeve in place.

20 Claims, 6 Drawing Sheets

U.S. PATENT DOCUMENTS

| | | | |
|---|---|---|---|
| 6,176,052 B1 * | 1/2001 | Takahashi | 52/232 |
| 6,247,500 B1 * | 6/2001 | McMahon | 138/157 |
| 6,550,819 B2 * | 4/2003 | DeSanto, Sr. | 285/192 |
| 6,627,817 B1 * | 9/2003 | Kortenbach | 174/74 R |
| 7,534,965 B1 * | 5/2009 | Thompson | 174/153 G |
| 7,596,914 B2 * | 10/2009 | Stahl et al. | 52/220.8 |
| 7,685,792 B2 | 3/2010 | Stahl, Sr. | |
| 7,878,463 B2 * | 2/2011 | Kauppila | 248/65 |
| 2001/0004023 A1 | 6/2001 | Munzenberger et al. | |
| 2004/0168398 A1 * | 9/2004 | Sakno et al. | 52/741.4 |
| 2006/0265980 A1 * | 11/2006 | Vaughan | 52/220.8 |
| 2008/0127582 A1 | 6/2008 | Turner | |
| 2009/0032281 A1 | 2/2009 | Turcovsky | |
| 2009/0197060 A1 | 8/2009 | Cho | |

FOREIGN PATENT DOCUMENTS

KR    20-0442186    10/2008

OTHER PUBLICATIONS

Abesco CT-120 Product Information; < Aug. 21, 2009 (obtained from the web at http://www.abesco.net/productus/products/ct120r.php; undated but known to date from before the Aug. 21, 2009 filing date of the parent of the present application), 2 pages.
SpecSeal Ready Split Sleeve Product Data Sheet;May 2007.
Unique Fire Stop Products Split Sleeve System—Installation Pictorial; May 2004.
International Search Report, PCT/US2010/045002, mailed Apr. 29, 2011, 3 pages.

* cited by examiner

SLEEVE SYSTEM AND METHOD OF USING

CROSS-REFERENCE TO RELATED APPLICATIONS

This application is a divisional of U.S. Ser. No. 12/545,331, filed Aug. 21, 2009, now allowed now U.S. Pat. No. 8,069,623, the disclosure of which is incorporated by reference in its entirety herein.

BACKGROUND

Wiring and the like are commonly passed through openings that penetrate e.g. through the interior walls of buildings. In the process of firestopping such through-penetrating openings, it is common practice to place the wiring in a sleeve and to position a firestop material, e.g., moldable intumescent putty, within the sleeve.

SUMMARY

Herein is disclosed a sleeve system and a method of using the system. The system uses an elongated open-ended sleeve, and mounting plate parts which mate with each other to form a mounting plate and which are securable to each other and to a wall. The mounting plate thus formed comprises a collar which, when the mounting plates parts are secured together, presses against portions of the outer surface of the sleeve to hold the sleeve in place.

Thus in one aspect, herein is disclosed a sleeve system for mounting onto an opening in a wall, comprising: an elongated, generally cylindrical open-ended sleeve with an outer surface and an inner surface and an outer diameter; first and second mounting plate parts which each comprise a base and which mate together and secure to each other to form a mounting plate; wherein the mounting plate formed by the mated and secured mounting plate parts comprises: a mounting plate base formed by mating together the base of the first mounting plate part and the base of the second mounting plate part; an annular collar which extends from the base of the mounting plate and defines an opening in the mounting plate, the annular collar being arranged so that when the first and second mounting plate parts are mated together and secured to each other, at least portions of the annular collar press against portions of the outer surface of the sleeve and thereby securely hold the sleeve in the opening of the mounting plate; and, wherein each mounting plate part comprises at least one tongue arranged so that when the mounting plate parts are mated together the at least one tongue of each mounting plate part is in overlapping relation with at least a portion of the mounting plate base that is provided by the base of the other mounting plate part, such that the tongue is in overlapping relation with at least a portion of a seam between the mated bases of the first and second mounting plate parts.

Thus in another aspect, herein is disclosed a method of mounting a sleeve system onto an opening that passes through a wall, comprising: inserting an elongated, open ended sleeve through the opening in the wall, the sleeve comprising an outer surface and defining an inner volume; mating first and second mounting plate parts together to form a mounting plate comprising a mounting plate base formed by mating together bases of the first and second mounting plate parts, wherein the mounting plate base comprises a perimeter sized and shaped to circumscribe the opening in the wall when the mounting plate is placed adjacent the wall; wherein the mounting plate further comprises a collar that extends outward from the mounting plate base and that defines an opening sized and shaped to receive the sleeve, wherein the area bounded by the perimeter of the base is greater by at least a factor of three than the area of the opening defined by the collar; and wherein the mating of the mounting plate parts together to form the mounting plate is performed so that at least one tongue of each mounting plate part is placed into overlapping relation with at least a portion of the mounting plate base that is provided by the base of the other mounting plate part, so that the tongue is in overlapping relation with at least a portion of a seam between the mated bases of the first and second mounting plate parts; securing the first and second mounting plate parts together in the mated condition, so that at least portions of the collar press against portions of the outer surface of the sleeve and thereby securely hold the sleeve in the opening of the base; and, optionally securing the mounting plate to the wall.

These and other aspects of the invention will be apparent from the detailed description below. In no event, however, should the above summaries be construed as limitations on the claimed subject matter, which subject matter is defined solely by the attached claims, as may be amended during prosecution.

Like reference numbers in the various figures indicate like elements. Some elements may be present in identical multiples; in such cases only one or more representative elements may be designated by a reference number but it will be understood that such reference numbers apply to all such identical elements. For certain components that may be present in interchangeable and/or identical multiples (e.g., pairs), any designation of "first" and "second" may apply to the order of use, as noted herein (with it being irrelevant as to which one of the components is selected to be used first). Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "top", "bottom", "upper", lower", "under", "over", "front", "back", "outward", "inward", and "up" and "down" may be used in this disclosure, it should be understood that those terms are used in their relative sense only unless otherwise noted.

DETAILED DESCRIPTION

Figure 1:
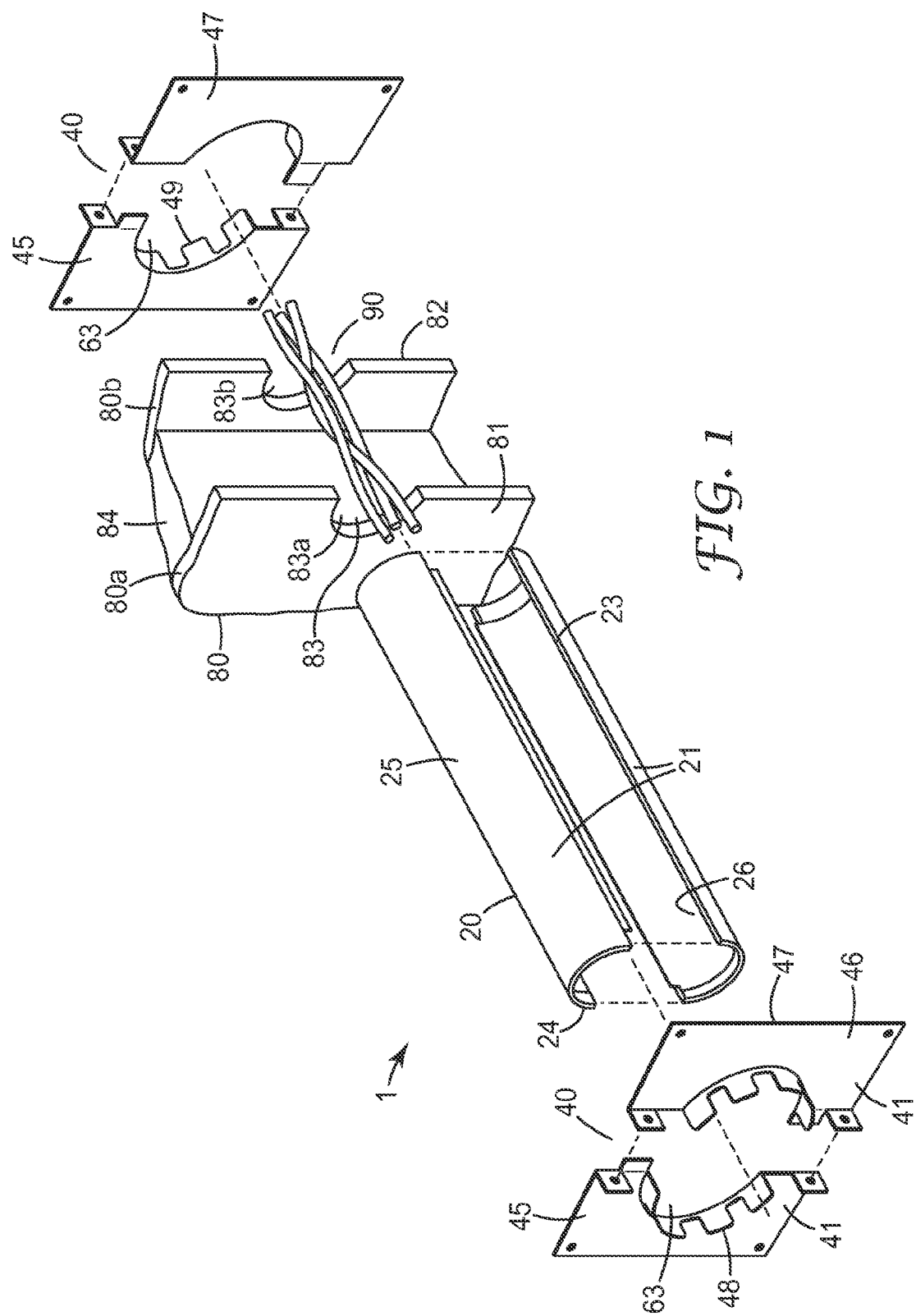
FIG. 1 is an exploded perspective view of an exemplary sleeve system disclosed herein, mounted in a through-penetration in a wall.

Shown in FIG. 1 in exploded perspective view is an exemplary sleeve system 1 that may be useful in the firestopping of a through-penetrating opening 83, e.g., in a wall of a building. In the present context, the term wall is used broadly to include vertical walls as well as horizontal floors/ceilings, etc. While the particular wall 80 shown in FIG. 1 comprises two partitions 80a and 80b, separated from each other by a cavity space established by stud 84 (in which case opening 83 comprises aligned openings 83a and 83b in partitions 80a and 80b respectively), wall 80 may comprise a single partition and may or may not comprise features such as stud 84. Wall 80 and/or partitions thereof may be comprised of commonly known building materials such as gypsum, wood, plaster, concrete, and the like.

Figure 2:
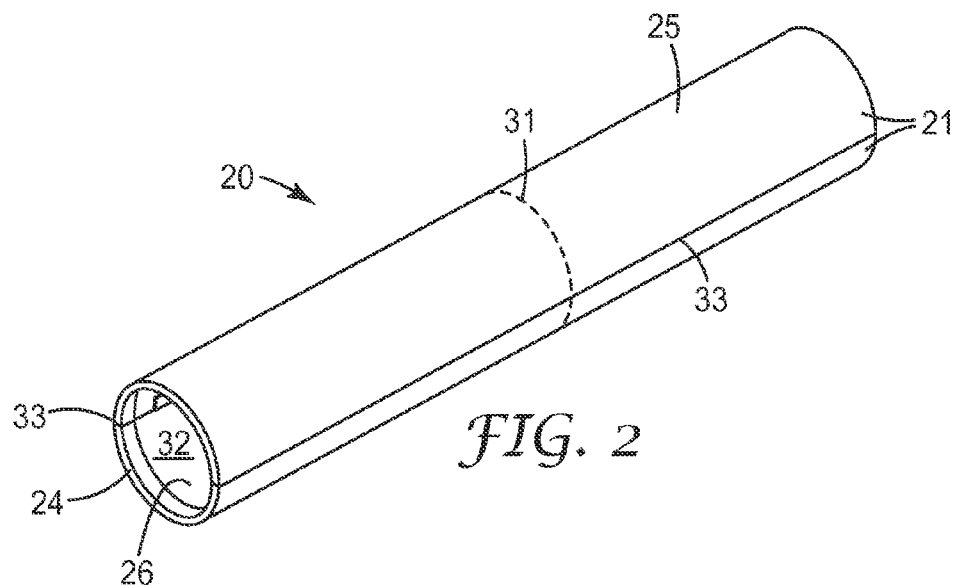
FIG. 2 is a perspective view of an exemplary sleeve.

With reference to FIGS. 1 and 2, sleeve system 1 comprises elongated sleeve 20 that comprises a longitudinal axis and that defines inner volume 32 therewithin. In some embodiments, sleeve 20 may be generally cylindrical, which term is broadly defined herein to encompass sleeves not only with substantially circular cross sectional shapes but also with shapes such as oval and the like. (In such cases, such terms as diameter, perimeter, annular, etc., will be understood to correspond to the parameter appropriate to the particular geometry of the sleeve). In some embodiments, sleeve 20 may be made of metal, e.g., 16 gauge sheet steel, 18 gauge sheet steel, and so on. In some embodiments, sleeve 20 may comprise a single, unitary piece that has already been formed into its final shape, when delivered to a user for installation in a wall. In other embodiments, sleeve 20 may be fabricated on site by a user, e.g., by taking a sheet material (e.g., sheet steel) and forming it into an elongated generally cylindrical sleeve.

However made, sleeve 20 comprises outer surface 25 and inner surface 26, and comprises short side edges 24, which may be annular edges as shown in the exemplary sleeve of FIG. 2. If desired, each short side edge 24 of sleeve 20 may comprise a rolled edge (e.g., formed by rolling or folding a terminal portion of the material of sleeve 20 back upon itself), which may minimize the chances of snagging or damaging any wiring that is passed through sleeve 20. Sleeve 20 may comprise centerpoint indicia 31 (which, e.g., may be printed, may be provided on label, or may be a physical marking such as an embossed notch) which may be useful in axially centering sleeve 20 in an opening in a wall.

In various embodiments, sleeve 20 may be provided in various sizes (e.g., in nominal diameters of 1 inch, 2 inches, and/or 4 inches) to fit various size openings in building walls, with (later-described) mounting plate 40, and opening 63 therein, sized to match. Sleeve 20 may range from, e.g., 6 inches in axial length, to 12 inches in length, to 18 inches or more.

When used in a wall opening, sleeve 20 may contain wiring. As used herein, the term "wiring" is used broadly to encompass any item such as wire, pipe, coaxial cable, fiber optic cable, tubing, conduit, and so on, whether carrying electricity for power, electricity for signaling, optical signals, and the like, which it might be desired to pass through an opening in a wall.

Figure 3:
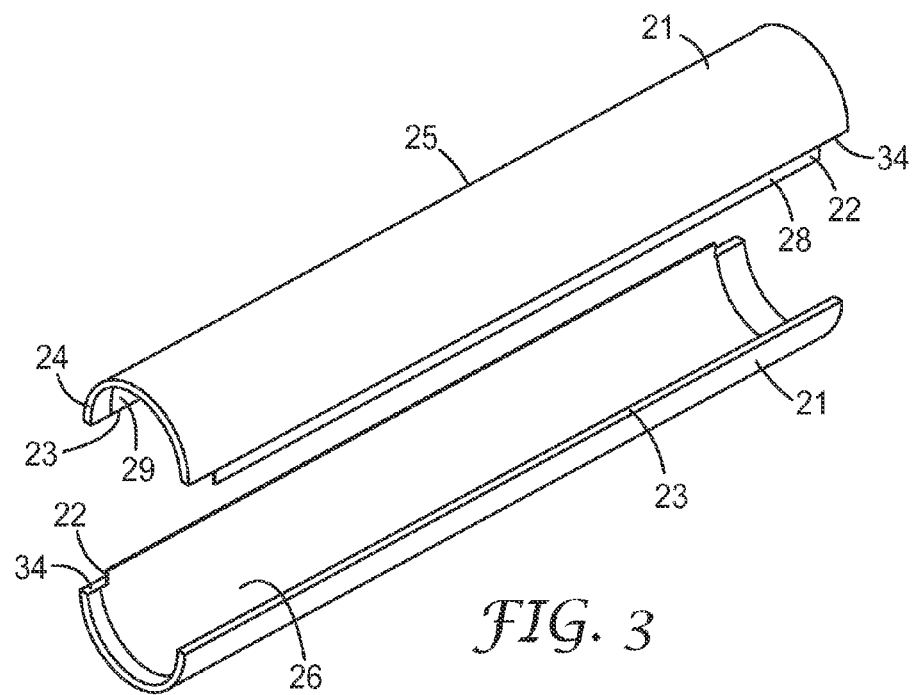
FIG. 3 is a perspective view of exemplary sleeve parts that can be mated together to form a sleeve.
Figure 4:
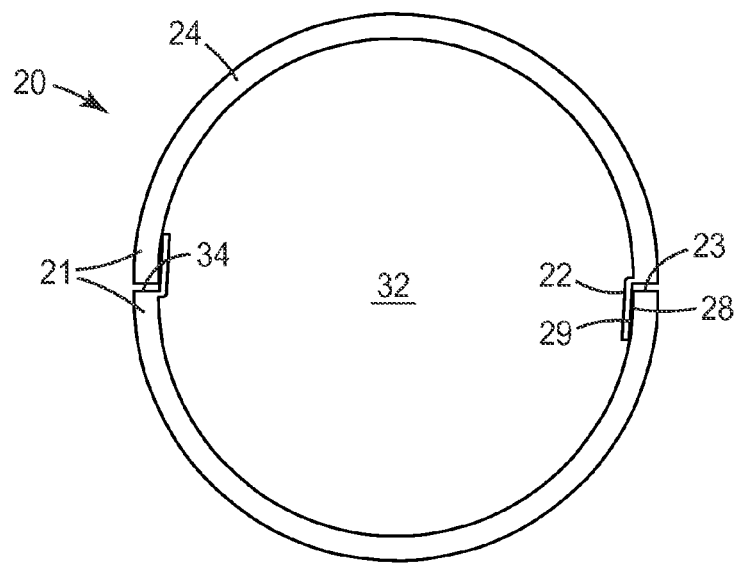
FIG. 4 is an end plan view showing the sleeve parts of FIG. 3 mated together to form a sleeve.

In some embodiments, sleeve 20 is comprised of identical sleeve parts 21, (of which exemplary examples are shown in FIG. 3), which can be mated with each other to form sleeve 20 as shown in FIG. 4. Such identical sleeve parts may be advantageous in that an end user (installer) may not be required to select such parts in any particular order for use and in that stocking of multiple, different parts may not be required. For convenience of description, sleeve parts 21 may be occasionally referred to herein as sleeve part 21' and sleeve part 21" (respective components thereof may also be designated by this '/" nomenclature). One of skill in the art will understand that such designation is arbitrary and may only signify, e.g., the order in which each of two identical parts is selected for use.

As shown in FIG. 3, sleeve parts 21 comprise outer surface 25 and inner surface 26, long side edges 23 and 34, and short side edges 24. It will be understood that certain features of sleeve parts 21 described herein will correspond to (similarly numbered) features of sleeve 20 formed by the mating of sleeve parts 21 (e.g., short side edges 24, outer surfaces 25, and inner surfaces 26, of sleeve parts 21, combine to respectively form short side edges 24, outer surface 25, and inner surface 26, of sleeve 20). In the illustrated embodiment, sleeve parts 21 each comprise at least one longitudinally extending tab 22 that protrudes generally circumferentially from long side edge 34, in a direction generally tangent to inner surface 26 of sleeve part 21 at a point adjacent long side edge 34 (e.g., as shown in FIGS. 3 and 4.) To facilitate mating of sleeve parts 21 together to form sleeve 20, each tab 22' of a sleeve part 21' is designed to press against area 29" (most easily seen in FIG. 4) of inner surface 26" that is circumferentially adjacent to long side edge 23" of sleeve part 21".

In some embodiments, tab 22 extends continuously (e.g., without interruption) along at least 70%, at least 80%, or at least 90%, of the axial length of long side edge 34 of sleeve part 21. In further embodiments, tab 22 may terminate less than about 1 inch, less than about ½ inch, or less than about ¼ inch, from short side edge 24 of sleeve part 21. Axially-terminal ends of tab 22 may be chamfered, angled, etc. as desired. Tab 22 may be formed from the same sheet of material (e.g., metal) that comprises sleeve part 21 (e.g., by performing one or more bending and/or cutting operations to provide tab 22); or, tab 22 may be provided e.g. by attaching (by soldering, welding, etc.) a separate piece of material to sleeve part 21.

In the exemplary designs shown herein only a single tab 22 is present on one long side edge 34 of sleeve part 21. However, in other embodiments multiple tabs 22 may be present along the length of long side edge 34 and/or one or more tabs may be provided along the length of long side edge 23 as well.

Sleeve 20 formed by the mating of sleeve parts 21 may comprise at least two generally axially oriented seams 33 formed by the abutting of long side edges 23 and 34 of sleeve parts 21 (specifically, the abutting of long side edge 23' of sleeve part 21' with long side edge 34" of sleeve part 21", and vice versa). Although shown herein as generally linear and straight, in various embodiments one or both seams 33 may comprise nonlinear shapes (e.g., wavy, sawtoothed, jagged, etc).

In some embodiments, paired sleeve parts 21' and 21" can be provided to a user already mated together to form sleeve 20. If to be used e.g. in the firestopping of a newly created opening in a wall (e.g., that does not contain existing wiring) sleeve 20 may be placed in the opening as is. If to be used in firestopping an opening that already contains wiring, it may be necessary to at least partially disassemble sleeve 20 into component sleeve parts 21 in order to position the wiring within sleeve 20. To enhance the ease of performing this operation, pre-mated sleeve parts 21 may be provided with a hinged connection that enables sleeve parts 21 to be momentarily opened into a clamshell configuration (for insertion of wiring) and then reclosed to reform sleeve 20.

Figure 5:
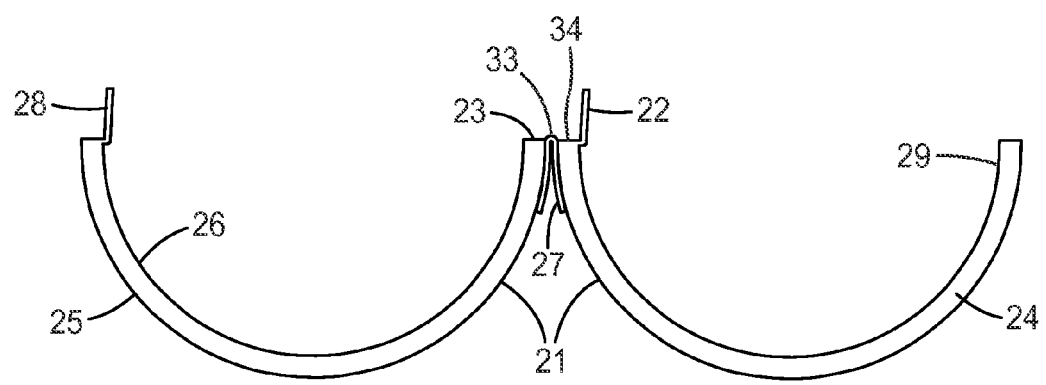
FIG. 5 is an end plan view of an exemplary sleeve opened into a clamshell configuration.

In some embodiments, this may be accomplished by the advantageous placement of one or more labels 27 on sleeve parts 21. Such a label (which may e.g. be adhesively attached to outer surfaces 25 of sleeve parts 21) may already be desired to be present, e.g. to identify the product, to provide instructions to a user, to mark an axial centerpoint, etc. For the purposes outlined herein, label 27 may be arranged as shown in FIG. 5. That is, label 27 may be attached (e.g., by adhesive bonding) to outer surfaces 25 of sleeve parts 21, spanning one of seams 33 between the two sleeve parts 21, so that the portion of label 27 that spans seam 33 functions as a hinge that allows sleeve parts 21 to be opened into a clamshell configuration (as shown in FIG. 5) and then reclosed. The properties (e.g., thickness strength, etc.) of label 27 and of the adhesive (e.g., pressure-sensitive adhesive) thereon may be chosen so as to be sufficiently strong and durable to allow such opening and closing of sleeve parts 21, e.g. multiple times if desired. In a further embodiment, an additional label (not shown in FIG. 5) can be arranged to span the other seam 33 (such that two labels are present, each spanning one of two seams 33). This can further stabilize sleeve parts 21 in their mated configuration. If desired, a user can at least partially remove one of the labels, or can cut through one of the labels where it spans seam 33, to allow sleeve parts 21 to be opened into the clamshell configuration (with the remaining label acting as a hinge).

Figure 6:
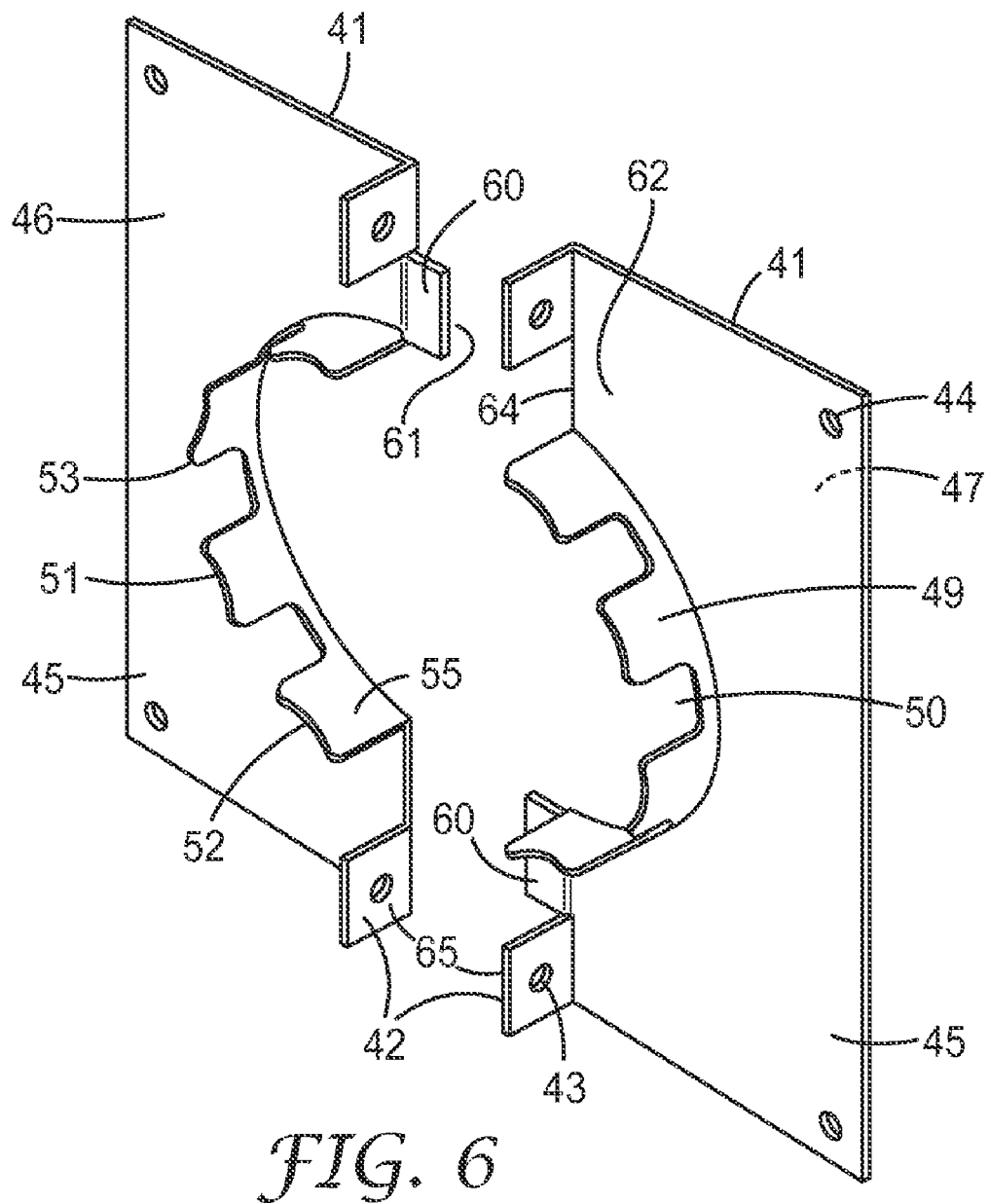
FIG. 6 is a perspective view of exemplary mounting plate parts that can be mated together to form a mounting plate.
Figure 7:
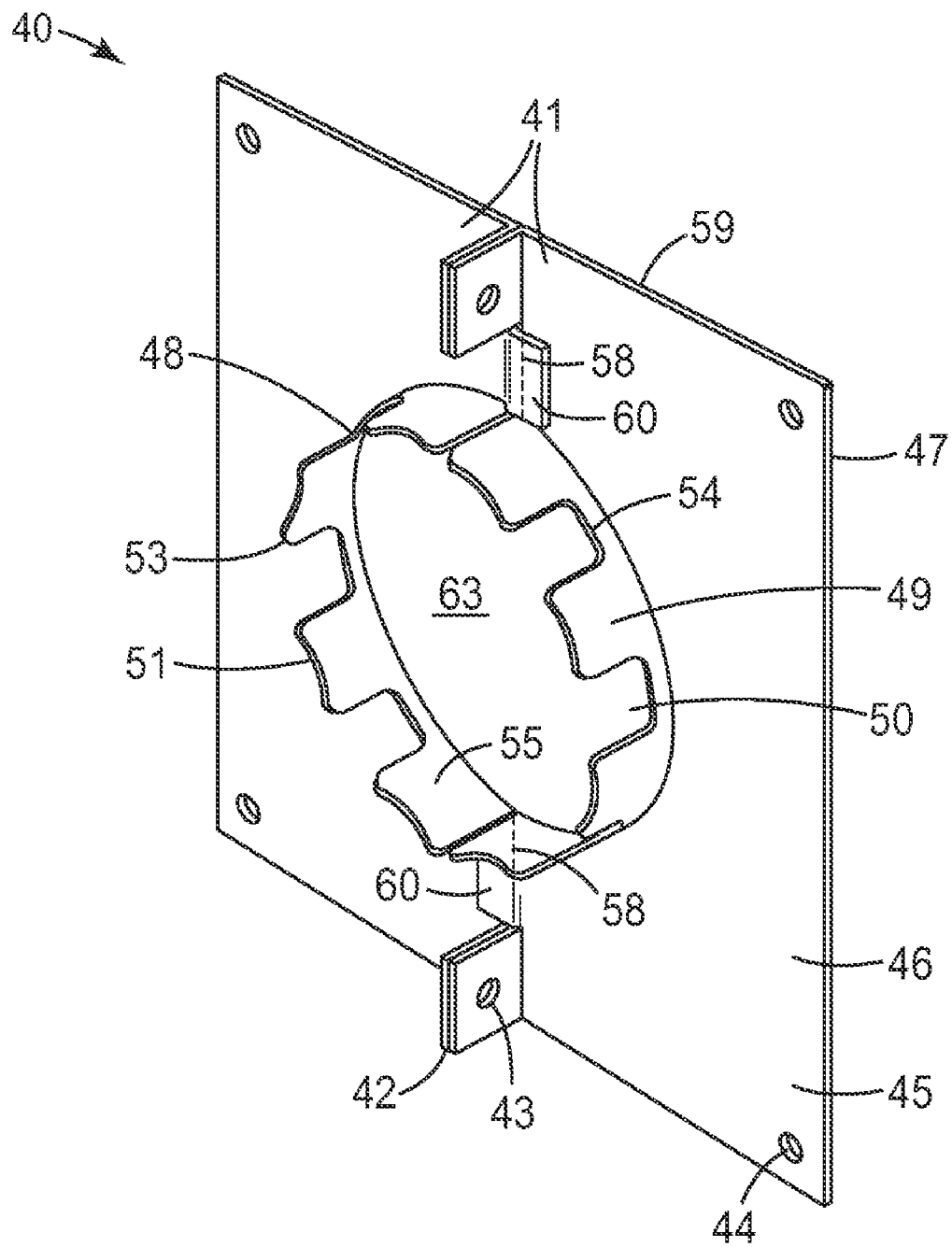
FIG. 7 is a perspective view showing the mounting plate parts of FIG. 6 mated together to form an exemplary mounting plate.

Sleeve system 1 comprises mounting plate parts 41 which may be mated (e.g., laterally mated) to each other to form mounting plate 40, as illustrated in FIGS. 6 and 7. In certain embodiments, mounting plate parts 41 may be identical, which may be advantageous in that a user may not be required to select such parts in any particular order for use and in that stocking of multiple, different parts may not be required. Mounting plate parts 41 may be occasionally referred to herein as first mounting plate part 41' and second mounting plate part 41" (respective components thereof may also be designated by this '/" nomenclature). One of skill in the art will understand that such designation is arbitrary and may only reflect, e.g., the order in which each of two identical parts is selected for use. In addition, it will be understood that certain features of mounting plate parts 41 described herein will correspond to (similarly numbered) features of mounting plate 40 formed by the mating together of mounting plate parts 41.

Mounting plate parts 41 may each comprise a base 45 (bases 45 of mounting plate parts 41 being mateable (e.g. abuttable) to each other to provide base 45 of mounting plate 40). In the mating of mounting plate parts 41' and 41" to form mounting plate 40, an edge 64' of base 45' of mounting plate part 41', and an edge 64" of base 45" of mounting plate part 41", may be abutted together, forming seam 58 in the process, as depicted in FIG. 7.

Each mounting plate part 41 may comprise one or more orifices 44 by which mounting plate 40 may be attached to a wall (e.g., to surface 81 of wall 80) by the use of one or more screws, bolts, nails, rivets, etc. Other mounting methods and devices may be used to attach mounting plate 40 to a wall (e.g., liquid adhesive, caulk, double-faced adhesive sheeting, and the like). Base 45 of mounting plate 40 comprises outward-facing surface 46 that, when mounting plate 40 is attached to wall 80, faces oppositely from wall 80. Base 45 of mounting plate 40 comprises wall-facing surface 47 that, when mounting plate 40 is attached to wall 80, faces toward wall 80. In some embodiments, a substantial portion of surface 47 may be in direct contact with a surface of wall 80 when mounting plate 40 is attached to wall 80 (e.g., in the exemplary configuration of FIG. 1, substantially all of surface 47 of mounting plate 40 is in direct contact with surface 81 of wall 80).

Base 45 of mounting plate 40 formed by the mating of plate parts 41 may be generally planar (with one or more tabs, tongues, etc., connected thereto, as disclosed later herein). Base 45 of mounting plate 40 may be designed such that perimeter 59 of mounting plate base 45 circumscribes (i.e. surrounds, not necessarily in a circular manner) opening 83 of wall 80 with which system 1 is to be used. Base 45 of mounting plate 40 may be generally square in shape (as in the exemplary design of FIG. 7). Or, base 45 of mounting plate 40 may be some other shape (e.g., rectangular, oval, irregular, etc.). The size (area) of base 45 may be chosen as desired, e.g., depending on the amount to which it may be desired that perimeter 59 of mounting plate base 45 is to be positioned beyond the edges of opening 83 in wall 80. In various embodiments, perimeter 59 of mounting plate base 45 may bound a total area of from about 40, about 60, or about 80 square inches. The total area bounded by perimeter 59 may be greater than the area of opening 63 of mounting plate 40 (discussed later herein), by a factor of at least about two, about three, or about four. The area of base 45 of mounting plate 45, in combination with other features discussed later herein, may allow system 1 to be used with a wall opening 83 that is significantly larger (e.g., 20% larger, 30% larger, or even 50% larger or greater) in diameter than the diameter of sleeve 20. For example, system 1 with sleeve 20 of 4 inch nominal diameter may be successfully used with a wall opening 83 of 6 inch diameter. Additionally, system 1 may be used successfully with wall opening 83 that is irregularly shaped. Such performance stands in contrast to systems which may only be suited for wall openings that are only slightly larger than the diameter of the sleeve used, and/or that closely match the shape of the sleeve used.

In various embodiments, mounting plate parts 41 are designed to mate together such that wall-facing surface 41 of mounting plate 40 is generally planar, as described in detail later herein.

Mounting plate parts 41 may each comprise at least one tab 42 that protrudes outward away from base 45 of mounting plate part 41. (As used herein, "outward" signifies a direction away from wall 80 when mounting plate 40 is placed thereupon). In particular embodiments (e.g., as shown in FIGS. 6 and 7), tab 42 may protrude generally perpendicularly outward from base 45 of mounting plate part 41.

In some embodiments, tab 42' of mounting plate part 41', and tab 42" of mounting plate part 41", are each located at edge 64 of their respective mounting plate part such that, when the two mounting plate parts 41 are mated to form mounting plate 40, tab 42' and tab 42" are abutted together such that major surface 65' of tab 42' and major surface 65" of tab 42" are in contact with each other (e.g., as pictured in FIGS. 6 and 7). Tabs 42 may each comprise at least one orifice 43 whereby tabs 42 may be fastened to each other thus securing mounting plate parts 41 to each other (e.g., by the use of one or more screws, bolts, nails, rivets, etc.). Other methods and devices may be used to secure tabs 42 to each other (e.g., liquid adhesive, caulk, double-faced adhesive sheeting, and the like).

In some embodiments, each mounting plate part 41 may include two tabs 42 (as shown in exemplary fashion in FIGS. 6 and 7), or more if desired. This arrangement may allow mounting plate parts 41 to be secured to each other in two locations, which may enhance the securing of mounting plate parts 41 together. With e.g. two tabs present, mounting plate parts 41 may still be identical to each other (e.g., as in the exemplary mounting plate parts of FIG. 6). In the particular embodiment in which tabs 42 protrude from base 45 of mounting plate part 41 at a nonperpendicular angle, each pair of tabs on a given mounting plate part can be at supplementary angles with respect to each other, so that two such mounting plate parts can still be identical to each other and the tabs of two such mounting plate parts can be mated to each other. If desired for ease of handling, one tab of a particular mounting plate may comprise a small orifice sized e.g. to accept a self-tapping screw, and another orifice on the other tab of that mounting plate may be slightly larger (e.g., such that a threaded shank of a screw can be easily passed through it), but small enough to prevent a screw head from passing through. Each mounting plate thus having a tab with a small orifice and a tab with a larger orifice, the use of identical mounting plates may be preserved. In various embodiments, tab(s) 42 can comprise an area (i.e., occupied by major surface 65 of tab 42) of at least about 0.3, about 0.5, or about 0.6 square inches.

Mounting plate parts 41 may each comprise one or more tongues 60. Tongue 60 may protrude generally laterally from base 45 of mounting plate part 41 (e.g., from edge 64' of base 45' of mounting plate part 41' that is abuttable against edge 64" of mounting plate part 41"). At least a portion of tongue 60 may be positioned slightly outwardly from surface 46 of base 45 of mounting plate 40, as shown in exemplary manner in FIG. 6. In some embodiments, tongue 60 may thus extend at a slight angle outward from surface 46 of base 45 of mounting plate part 41. In other embodiments, tongue 60 may extend generally parallel to surface 46 of based 45, but may be offset a slight distance outward from surface 46, as in the exemplary arrangement of FIG. 6. This may be achieved e.g. by attaching a separate sheet of material to surface 46 of base 45 to form tongue 60; or, by providing tongue 60 as an extension of the material forming base 45, with multiple bends in tongue 60 at or near its junction with base 45 (as shown in exemplary manner in FIG. 6). However achieved, at least a portion of tongue 60 may be displaced outward relative to the plane of base 45 and surface 46 thereof, so that when mounting plate parts 41 are mated together, at least a portion of tongue 60 of one of the plates, may be placed into overlapping relation with a portion of the base of the other plate. That is, with reference to FIGS. 6 and 7, when mounting plate parts 41' and 41" are mated together to form mounting plate 40, at least a portion of tongue 60' of mounting plate part 41' may extend over area 62" of surface 46" of base 45" of mounting plate part 41". In some embodiments, when mounting plate parts 41 are mated together the distance from inward (wall-facing) surface 61' of tongue 60' to area 62" of surface 46' of mounting plate 40 may be less than about 1/16 inch. In particular embodiments, surface 61' of tongue 60' may directly contact at least a portion of area 62". In various embodiments, the area of tongue 60 (i.e., occupied by surface 61 of tongue 60) may be at least about 0.3, about 0.5, or about 0.6 square inches. The aforementioned overlapping may have advantages, as described later herein.

In specific embodiments of the type pictured in FIGS. 6 and 7, mounting plate parts 41 are identical, and each mounting plate part 41 comprises at least one tongue 60 that, when mounting plate parts 41 are mated together, may be placed into overlapping relation with a portion of the other base plate. The particular configurations shown in FIGS. 6 and 7 may be advantageous in that each tongue 60 may be positioned outwardly of the portion of the mounting plate base with which it is in overlapping relation. Such arrangements may allow a significant portion, or substantially all, of surface 47 of base 45 of mounting plate 40 to be generally planar and to be placeable into contact with a wall surface (as opposed to there being one or more at least partially protruding features, e.g., tongues, present in this location, that might interfere with a desired placement of surface 47 flush against a wall surface).

With reference to FIGS. 6 and 7, mounting plate parts 41 comprise features such that, when the plate parts are mated together, the thus-formed mounting plate 40 comprises collar 48 that defines (i.e., bounds) opening 63 therein. (In use of system 1, opening 63 defined by collar 48 may be generally aligned with opening 83 in wall 80). In some embodiments, collar 48 may be an annular collar that defines generally circular opening 63. Annular collar 48 may be at least partially defined by plurality of flanges 49 that each extend generally outward from base 45 of mounting plate 40. Each of flanges 49 may comprise radially inward-facing surface 55, at least a portion of which is adapted to contact outer surface 25 of sleeve 20 when sleeve system 1 is assembled, as explained in further detail later herein. Flanges 49 of collar 48 may be circumferentially separated from each other by notches 50. Collar 48 may comprise generally annularly continuous base portion 54 from which individual flanges 49 protrude (with annular collar 48 thus having a circumferentially continuous base portion 54 with a circumferentially discontinuous portion extending outward therefrom, the discontinuous portion being comprised of flanges 49 circumferentially interrupted by notches 50). The junction of base portion 54 of collar 48 with base 45 of mounting plate 40 may be radiused, e.g., with a radius of curvature of at least about 1/16 inch, which may advantageously minimize the presence of any sharp corners or edges which might interfere with the positioning of sleeve 20 within opening 63 of mounting plate 40.

Annular collar 48 may be designed so that the diameter defined by surfaces 55 of flanges 49 when mounting plate parts 41 are mated and secured together in the absence of a sleeve is slightly less than the actual (outer) diameter of sleeve 20 to be used in system 1, so that when mounting plate parts 41 are mated and secured together to form mounting plate 40, at least portions of surfaces 55 of flanges 49 press against portions of outer surface 25 of sleeve 20 and thereby securely hold sleeve 20 in opening 63 of mounting plate 40. (In this context, slightly less means that the diameter so defined may range from about 94% to about 99.9% of the actual diameter of sleeve 20).

Figure 8:
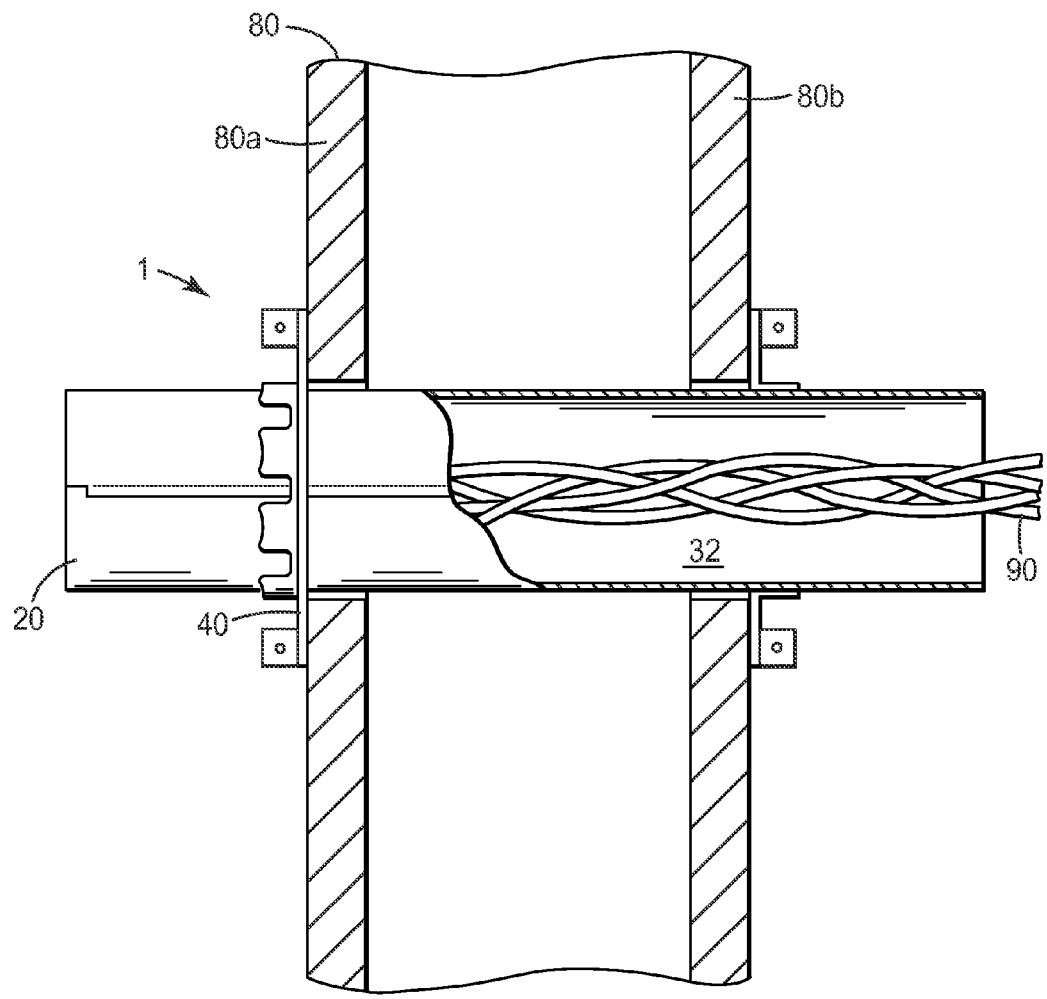
FIG. 8 is a side plan view in partial cross section of an exemplary sleeve system disclosed herein, mounted in a through-penetrating opening in a wall.

At least some of flanges 49 are extended outwardly from base 45 of mounting plate 40 such that, in use, they are generally aligned with the longitudinal axis of sleeve 20 (e.g., as shown in FIGS. 1 and 8). Within this general limit, at least some of flanges 49 may be raked, by which is meant that at least some flanges 49 (or, at least terminal portions thereof) are angled slightly radially inward (i.e., away from perpendicular with respect to base 45 of mounting plate 40) in such manner that terminal ends (tips) 51 of flanges 49 define a circle with slightly smaller diameter than a circle defined by the junctions of flanges 49 with base portion 54 of collar 48. (In this context, a slightly smaller diameter means that the smaller diameter may range from about 94% to about 99.9% of the larger diameter). In various embodiments, rake angles may be used of from about 4 degrees to about 0.1 degree (with rake angle being defined as the amount that the flange is angled away from being perpendicular to base 45). In specific embodiments, rake angles may be used of from about 1.5 to about 2.5 degrees.

This raking of flanges 49 may provide that contact of surfaces 55 of flanges 49 with outer surface 25 of sleeve 20 takes place preferentially in an area of radially inwardly-facing flange surface 55 that is proximate flange terminal end 51. This arrangement may cause flanges 49 to each act as a cantilevered leaf spring that exerts pressure on sleeve 20, which may enhance the secure holding of sleeve 20 in place within opening 63 of mounting plate 40.

In various embodiments, the distance that terminal ends 51 of flanges 49 are positioned outward from surface 46 of base 45 may be at least about 0.3, at least about 0.6, or at least about 0.8 inches. Flanges 49 may comprise generally circumferentially rounded corners 53, as pictured in FIGS. 6 and 7. Terminal ends 51 of flanges 49 may comprise scallops 52, also as pictured in FIGS. 6 and 7. Individual flanges 49 and/or terminal ends 51 thereof may be relatively circumferentially straight, e.g., such that an interrupted circle defined by flanges 49 (when viewed along an axis generally perpendicular to base 45 of mounting plate 40) may be more precisely termed a generally circularly interrupted polygon. Alternatively, individual flanges 49 and/or terminal ends 51 thereof may be arcuate (e.g., as shown in FIGS. 6 and 7), such that flanges 49, when so viewed, define an interrupted circle. The arcuate shape of each individual flange 49 and/or the terminal end 51 thereof may generally match the shape of the junction of the particular flange with base portion 54 of collar 48 of mounting plate 40.

The various components of annular collar 48 (flanges 49, base portion 54, etc.), as well as tab(s) 42, tongue(s) 60, etc., may be formed from the same sheet of material (e.g., metal) comprising mounting plate part 41 (e.g., by performing one or more bending and/or cutting operations); or, they may be provided e.g. by attaching (by soldering, welding, etc.) one or more separate pieces of material to mounting plate part 41.

Components as described herein may be supplied as kits, which may include, for example, two or more mounting plate parts 41, and one or more sleeves 20 and/or two or more sleeve parts 21. Such kits may optionally include any or all of firestop putty, space-filling material (as described in further detail later herein), installation instructions, screws or other devices for attaching mounting plate parts 41 to each other and/or for attaching mounting plate 40 to a wall, firestop gasketing material, and so on.

With reference to FIGS. 1 and 8, in use of sleeve system 1, sleeve 20 may be placed into opening 83 (which, in the case of a stud wall, may be comprised of aligned openings 83a and 83b) of wall 80 (e.g., after sleeve 20 having been opened and wiring 90 inserted therein, as discussed earlier). Sleeve 20 may be axially centered relative to wall 80 (i.e., so that portions of sleeve 20 of generally similar axial length protrude from each side of wall 80). Mounting plate parts 41' and 41" may then be positioned at the desired axial location of sleeve 20 and mated together and secured to each other to form mounting plate 40 with sleeve 20 positioned within opening 63 defined by collar 48 of mounting plate 40. The securing of mounting plate parts 41 together may result in pressure being applied (e.g., by flanges 49 of mounting plate 40) against outer surface 25 of sleeve 20 so that sleeve 20 is held securely at least in a first axial location of sleeve 20. Mounting plate 40 may then be optionally attached to wall 80.

The manner in which these operations are performed may be varied as desired, as will be appreciated by those of skill in the art. For example, mounting plate parts 41 may be secured to each other after which the thus-formed mounting plate 40 is attached to wall 80; or, one mounting plate part 41 may be attached to wall 80, the two mounting plate parts 41 secured to each other, and then the other of the two mounting plate parts attached to wall 80. In some cases, it may not be necessary to attach mounting plate 40 to wall 80, e.g., if two mounting plates 40 are mounted on sleeve 20 on opposite sides of wall 80 so that sleeve 20 is securely held in opening 83 even without one or both mounting plates 40 being attached to wall 80. In some circumstances, only one mounting plate 40 may be used, if desired. For example, if system 1 is to be used to firestop an opening in a horizontal wall (e.g., a floor), it may only be necessary to use one mounting plate 40, e.g., located above the upper surface of the floor. That is, in such a case it may not be necessary to use an additional mounting plate 40 below the lower surface of the floor.

Regardless of the implementation, the result is that sleeve 20 is securely held in place within opening 83 of wall 80. (If not already present, wiring 90 can be passed through inner volume 32 defined by sleeve 20.) If desired, a second set of mounting plate parts may be similarly positioned on the other side of wall 80, secured to each other to hold sleeve 20 securely in at least a second axial location, and attached to wall surface 82, as in the exemplary embodiments of FIGS. 1 and 8.

Sleeve system 1 may be used as an aid to firestopping an opening 83 in a wall 80. Accordingly, if desired, firestop material (e.g., moldable firestop putty, for example the product available from 3M Company, St. Paul, Minn., under the trade designation MP+), may be placed within at least a portion of inner volume 32 defined by sleeve 20, according to methods well known to those of skill in the art. Firestop material may be placed generally only at one end of inner volume 32 defined by elongated sleeve 20, at both ends, or all along the length of sleeve 20, as may be called for by the particular circumstances and as is well understood by those of skill in the art. Depending on the particular circumstances, additional material (e.g., space-filling material, for example the product available from 3M Company, St. Paul, Minn., under the trade designation Fire Barrier Packing Material PM4) may be placed within inner volume 32 to aid in the functioning of the firestop material.

Optionally, additional materials, for example firestop gasketing material (e.g., intumescent sheeting such as graphite-loaded sheeting and the like, for example the product available from 3M Company under the trade designation Fire Barrier Expantrol Flexible Intumescent Strip), may be placed between mounting plate 40 and wall 80, to enhance the functioning of sleeve system 1. In addition to this, or in place of this, perimeter 59 of mounting plate 40 may be sealed (e.g., with fire-resistant caulk or the like) against wall 80. However, this may not be necessary in the use of sleeve system 1. The inventors have discovered that when wall openings that are firestopped by the use of sleeve system 1 as disclosed herein are tested according to the methods outlined in UL 1479/ ASTM E814-08b (as specified in 2008), surprisingly high fire ratings may be achieved, even in the absence of components such as the aforementioned intumescent sheeting.

The ASTM E814 Standard Test Method is often used to evaluate a firestop system (mounted in a through-penetration) for its ability to withstand exposure to flame, heat and a subsequent water hose stream. Each tested system is assigned an F Rating (an hourly rating indicating how long the system will withstand the passage of flame), and a T Rating (an hourly rating indicating how long the system will prevent a particular temperature rise on the side of the wall away from the fire). The test also involves subjecting the firestopped through-penetration (after the exposure to fire) to a stream of water to determine the ability of the system to prevent the passage of water.

The inventors have found that, surprisingly, fire ratings of e.g. 1 hour on the F scale, or even 2 hours on the F scale, can be achieved with the use of sleeve system 1, without the use of any extra components or steps such as the aforementioned intumescent gasketing material, edge caulking, and the like. Such performance may also be achieved without using e.g. multiple mounting plates in a stacked configuration in which the individual mounting plates are rotated relative to each other so as to minimize the degree to which any seams or slots in a plate coincide with seams or slots in another plate. (Such extra components and/or steps would of course be cumbersome and expensive). Without wishing to be limited by theory or mechanism, the inventors postulate that this surprising result may result in least in part from the manner in which mounting plate parts 41 mate together to form mounting plate 40 so as to minimize or obstruct any pathway that may be present as a result of the seam between the mated plate parts, from the manner in which mounting plate 40 securely holds sleeve 20 in place, or some combination of these factors.

For example, the performance of system 1 may be enhanced by the presence of tongues 60 which are in overlapping relation with at least a portion of seam 58 that is present between abutted edges 64 of bases 45 of mounting plate parts 41. Tongues 60 so positioned may act to at least partially obstruct any pathway (e.g., through which heated gases might penetrate) through mounting plate 40 caused by the presence of seam 58. The performance of system 1 may also be enhanced by the design of mounting plate 40 in which portions of annular collar 48 press against portions of the outer surface 25 of sleeve 20 and thereby securely hold sleeve 20 in opening 63 of mounting plate 40. The performance of system 1 may be further enhanced by the design of tabs 42, which protrude outward from base 45 of mounting plate 40 and which may comprise a relatively large area, and so may act to further act to at least partially obstruct any pathway through mounting plate 40 caused by the presence of seam 58.

While exemplary embodiments of system 1 have been described with reference to generally cylindrical sleeve 20, with generally annular collar 48 of mounting plate 40 designed to receive the sleeve and to function therewith as described herein, in the broadest sense the disclosures herein will be understood by those of skill in the art to be useful with sleeves of any (cross sectional) shape, e.g., square, rectangular, diamond, irregular, and the like. In such embodiments, collar 48 of mounting plate 40 can be shaped (e.g., to match the shape of sleeve 20) to receive sleeve 20 within opening 63 defined thereby, in order that sleeve 20 be securely held therein according to the principles disclosed herein.

EXAMPLES

Sleeve parts were produced of the general design shown in FIGS. 3 and 4, of nominal 4 inch diameter and nominal 12 inch length, with rolled edges. Each sleeve part comprised one tab that protruded circumferentially approximately 0.7 inch from a long edge of the sleeve part, and that extended continuously along the length of the long edge and that terminated approximately ½ inch from each rolled edge of the sleeve part. The sleeve parts were made by bending and cutting of 18 gauge sheet steel, using metal-forming methods well known to those in the art. Each tab of a sleeve part was formed of the same metal sheeting that comprised the body of the sleeve part.

Mounting plate parts were produced of the general design shown in FIGS. 6 and 7. Each mounting plate part was formed of 18 gauge steel and comprised a base with a long side length of approximately 8 inches and a short side length of 3⅞ inches, with one long side of the base being interrupted by semicircular opening defined by a semi-annular collar with semi-radius of approximately 2 inches. The semi-annular collar comprised four flanges that extended approximately one inch generally perpendicularly outward from the base of the mounting plate part. The flanges each extended from a circumferentially continuous semi-annular base portion of the semi-annular collar that protruded approximately 5/16 inch outward from the mounting plate part base (with the one inch total extension of the flanges including this contribution from the base portion). The base portion of the collar joined the base of the mounting plate part with a radius of curvature that was estimated to be a few mm. Each flange was arcuate in shape so as to be generally congruent in shape with the portion of the continuous semi-annular collar that the flange protruded from. Each flange terminated at a scalloped tip with rounded corners. The flanges were separated by notches with rounded edges. The base of the mounting plate part and the semi-annular collar and flanges protruding therefrom were all formed of the same metal sheeting, with the annular collar and flanges formed by bending and cutting the metal sheeting using methods known to those in the art.

Each mounting plate part comprised two tabs that extended generally perpendicularly outward from the base of the mounting plate. Each tab was at a terminal end of the long side edge of the mounting plate part that comprised the semicircular opening. Each tab extended approximately ¾ inch perpendicularly outward from the base of the mounting plate and was approximately 15/16 inch in length (when measured along the long side edge of the base of the mounting plate). The tabs were each oriented parallel to the long edge of the base of the mounting plate part and were colinear. The tabs were formed by welding sheet steel pieces to the mounting plate parts in the aforementioned configuration. Each tab contained an orifice suitable for insertion of a screw.

Each mounting plate part comprised a tongue positioned along the long side edge of the mounting plate base that comprised the tabs and the semicircular opening, between the annular semi-collar (at the point where the semi-collar terminated at the long edge of the mounting plate base) and one of the tabs. The tongue protruded approximately ½ A inch beyond the long edge of the base plate, with the plane of the tongue generally parallel to the plate of the base plate. The tongue was formed by welding a piece of sheet steel to the front surface (the surface from which the semi-annular collar/ flanges and tabs protruded) of the base of the mounting plate part. The protruding portion of the tongue was thus offset outward from the base of the mounting plate part, thus ensuring that when the mounting plate part was mated to another such mounting plate part the tongue would be placed in overlapping relation with a portion of the base of the other mounting plate part. Two of the above-described mounting plate parts could be mated together, and secured together by way of the above-described tabs, to form a mounting plate comprising a generally planar base of approximately 8 inches×7¾ inches in size, with an annular collar of diameter approximately 4 inches extending outward therefrom, and with overlapping tongues as described above.

Several such mounting plates and sleeve parts were produced. The sleeve parts were mated into sleeves of 4 inch nominal diameter.

For testing, nominal 34 inch×34 inch vertical walls were assembled each comprising 3⅝ inch deep steel studs on 24 inch nominal spacing, faced on each side with two layers of nominal ⅝ inch thick Type X gypsum board. Aligned 6 inch diameter holes were provided in each of the layered gypsum board stacks on opposing sides of the stud walls.

For each test, a sleeve was axially centered in the stud wall opening and mounting plate parts were mated together to form a mounting plate with the sleeve contained in the opening defined by the annular collar of the mounting plate. The mounting plate parts were secured together by way of screws used to fasten the tabs of the plate parts together thus causing the flanges of the annular collar to hold the sleeve securely at a particular axial location. The mounting plate was secured to a first surface of the stud wall by way of screws inserted through orifices in the corners of the mounting plate. A second mounting plate was similarly assembled and was secured to the second (opposite) surface of the wall (except as noted).

For each test, a portion of MP+ Firestop Putty of nominal 1 inch (axial) depth was placed into each axial terminal end of the sleeve.

Numerous variations of this design were assembled. In some cases, the sleeve was empty (e.g., contained no wiring). In such cases, a packing material (mineral wool batting, or in some cases PM4 Packing Material) with nominal 2 inch axial depth was positioned adjacent to, and axially behind, the firestop putty (that is, between the putty and the axial centerpoint of the sleeve). In some cases, the sleeve contained assorted wiring (various mixtures of No. 24 AWG copper telephone cables, No. 12 AWG copper conductor control cables, No. 2/0 AWG aluminum conductor SE cables, No. 23 AWG Category 6 data cables, fiber optical cables, coaxial cables, and/or 1/C-750 kcmil copper power cables). When wiring was present, care was taken that the putty filled the interstices between the various cables. In various cases, wiring (cable) fills of 30%, and of 48%, were used. Some experiments were run as above (including wiring) except that the opening in the stud wall was 4.5 inches in diameter rather than 6 inches. In some cases the steel studs were on 16 inch spacings. In some cases the wall used for testing was a nominal 6 foot wide by 7 foot high vertical walls (with 3⅝% inch deep steel studs on 24 inch nominal spacing, faced on each side with two layers of nominal ⅝ inch thick Type X gypsum board). In some cases the wall used for testing was a horizontal 56 inch×70 inch×4½ inch thick lightweight concrete floor slab (in such cases, only one mounting plate was used, in a position in contact with the top surface of the floor, and firestop putty was only placed in the uppermost inch of the vertically oriented sleeve, with two inches of packing material immediately beneath the putty).

The various firestopped openings as described above were tested according to the methods of ASTM E-814 (UL 1479), with testing witnessed, and results reported, by an independent testing organization. Results of a representative test (with the sleeve system used in a wall opening of 6 inch diameter in the aforementioned 34 inch×34 inch gypsum-faced stud wall at 24 inch stud spacing, and containing a wiring mixture at 48% fill) are reported in Table 1.

TABLE 1

| Test Number | Test Duration (Minutes) | F Rating, (Hours) | T rating (Hours) | Hose Stream Test (Pass/Fail) |
|---|---|---|---|---|
| 09-0099-D | 120 | 2 | ¾ | Pass |

The tests and test results described above are intended solely to be illustrative, rather than predictive, and variations in the testing procedure can be expected to yield different results. All quantitative values in the Examples section are understood to be approximate in view of the commonly known tolerances involved in the procedures used. The foregoing detailed description and examples have been given for clarity of understanding only. No unnecessary limitations are to be understood therefrom.

It will be apparent to those skilled in the art that the specific exemplary structures, features, details, configurations, etc., that are disclosed herein can be modified and/or combined in numerous embodiments. All such variations and combinations are contemplated by the inventor as being within the bounds of the conceived invention. Thus, the scope of the present invention should not be limited to the specific illustrative structures described herein, but rather by the structures described by the language of the claims, and the equivalents of those structures.

What is claimed is:

1. A sleeve system for mounting onto an opening in a wall, comprising:
   an elongated, generally cylindrical open-ended sleeve with a long axis and with an outer surface and an inner surface and an outer diameter;
   first and second mounting plate parts which each comprise a base and which mate together and secure to each other to form a mounting plate;
   wherein the mounting plate formed by the mated and secured mounting plate parts comprises:
      a mounting plate base formed by mating together the base of the first mounting plate part and the base of the second mounting plate part;
      an annular collar which extends from the base of the mounting plate and defines an opening in the mounting plate, the annular collar being arranged so that when the first and second mounting plate parts are mated together and secured to each other, at least portions of the annular collar press directly against portions of the outer surface of the sleeve and thereby securely hold the sleeve in the opening of the mounting plate in a fixed position in which the long axis of the sleeve is substantially perpendicular to the wall;
   and,
   wherein each mounting plate part comprises at least one tongue arranged so that when the mounting plate parts are mated together the at least one tongue of each mounting plate part is in overlapping relation with at least a portion of the mounting plate base that is provided by the base of the other mounting plate part, such that the tongue is in overlapping relation with at least a portion of a seam between the mated bases of the first and second mounting plate parts.

2. The system of claim 1 wherein each mounting plate part further comprises at least one fastening tab that protrudes outwardly from the base of the mounting plate part, each fastening tab being arranged to be secured to a fastening tab of the other mounting plate part so as to secure the pair of mounting plate parts together to form the mounting plate.

3. The system of claim 2 wherein the fastening tab of each mounting plate part protrudes generally perpendicularly from the base of the mounting plate part.

4. The system of claim 1 wherein the first and second mounting plate parts are identical to each other.

5. The system of claim 1 wherein the diameter of the collar formed when the mounting plate parts are mated together is slightly less than the outer diameter of the sleeve, so that when the mounting plate parts are mated and secured together to form the mounting plate, at least portions of the annular collar press against portions of the outer surface of the sleeve and thereby securely hold the sleeve in the opening of the mounting plate.

6. The system of claim 1 wherein the system is configured to receive an amount of firestop material within at least a portion of the interior volume of the elongated open-ended sleeve.

7. The system of claim 6 wherein, when used to firestop an opening in a wall, the system is capable of providing at least a one hour F rating and a one hour T rating when tested in accordance with the methods outlined in ASTM E814 as specified in 2008.

8. The system of claim 7 wherein the system does not include a firestop gasketing material configured to be placed between the base of the mounting plate and the wall.

9. The system of claim 1 comprising first and second identical sleeve parts that mate together to form the sleeve.

10. The system of claim 9 wherein the first and second sleeve parts each comprise first and second long side edges and wherein each of the sleeve parts comprises at least one tab that protrudes from at least a portion of the first long side edge of that sleeve part, and further wherein when the first and second sleeve parts are mated together to form a sleeve, a tab of each sleeve part is positioned radially inward of, and in contact with at least a portion of, the inner surface of the sleeve at a location proximal to a long side edge of the other sleeve part.

11. The system of claim 10 wherein the first and second sleeve parts each comprise a single tab, that protrudes from the first long side edge of that sleeve part and that extends generally along the length of the long side edge to within about ¼ inch of each end of the long side edge.

12. The system of claim 10 wherein the first and second sleeve parts are supplied mated together into a sleeve, with first and second seams being present between abutted long side edges of the first and second sleeve parts, and wherein at least a first label is attached to the outer surface of the sleeve so that at least a portion of the label is in overlapping relation with at least a portion of the first seam.

13. A sleeve system for mounting onto an opening in a wall, comprising:
   an elongated, generally cylindrical open-ended sleeve with an outer surface and an inner surface and an outer diameter;
   first and second mounting plate parts which each comprise a base and which mate together and secure to each other to form a first mounting plate;
      wherein the first mounting plate formed by the mated and secured mounting plate parts comprises:
         a first mounting plate base formed by mating together the base of the first mounting plate part and the base of the second mounting plate part;
         a first annular collar which extends from the base of the first mounting plate and defines an opening in the first mounting plate, the first annular collar being arranged so that when the first and second mounting plate parts are mated together and secured to each other, at least portions of the first annular collar press against portions of the outer surface of the sleeve and thereby securely hold the sleeve in the opening of the first mounting plate;
      wherein the first and second mounting plate parts each comprise at least one tongue arranged so that when the first and second mounting plate parts are mated together to form the first mounting plate the at least one tongue of each mounting plate part is in overlapping relation with at least a portion of the first mounting plate base that is provided by the base of the other mounting plate part, such that the tongue is in overlapping relation with at least a portion of a seam between the mated bases of the first and second mounting plate parts;
   and further wherein the wall comprises first and second oppositely facing surfaces, wherein the first mounting plate formed from the mated first and second mounting plate parts is attachable to the first surface of the wall and wherein at least portions of the first annular collar of the first mounting plate press against portions of the outer surface of the sleeve at a first axial location of the sleeve, and wherein the system further comprises third and fourth mounting plate parts that mate to form a second mounting plate that faces oppositely from the first mounting plate and that is attachable to the second surface of the wall and that comprises a second annular collar at least portions of which press against portions of the outer surface of the sleeve at a second axial location of the sleeve.

14. The system of claim 13 wherein the system is configured to receive an amount of firestop material within at least a portion of the interior volume of the elongated open-ended sleeve.

15. The system of claim 14 wherein, when used to firestop an opening in a wall, the system is capable of providing at least a one hour F rating and a one hour T rating when tested in accordance with the methods outlined in ASTM E814 as specified in 2008.

16. The system of claim 15 wherein the system does not include a firestop gasketing material configured to be placed between the base of the mounting plate and the wall.

17. The system of claim 13 comprising first and second identical sleeve parts that mate together to form the sleeve.

18. The system of claim 17 wherein the first and second sleeve parts each comprise first and second long side edges and wherein each of the sleeve parts comprises at least one tab that protrudes from at least a portion of the first long side edge of that sleeve part, and further wherein when the first and second sleeve parts are mated together to form a sleeve, a tab of each sleeve part is positioned radially inward of, and in contact with at least a portion of, the inner surface of the sleeve at a location proximal to a long side edge of the other sleeve part.

19. The system of claim 18 wherein the first and second sleeve parts each comprise a single tab, that protrudes from the first long side edge of that sleeve part and that extends generally along the length of the long side edge to within about ¼ inch of each end of the long side edge.

20. The system of claim 18 wherein the first and second sleeve parts are supplied mated together into a sleeve, with first and second seams being present between abutted long side edges of the first and second sleeve parts, and wherein at least a first label is attached to the outer surface of the sleeve so that at least a portion of the label is in overlapping relation with at least a portion of the first seam.

* * * * *

UNITED STATES PATENT AND TRADEMARK OFFICE
CERTIFICATE OF CORRECTION

PATENT NO. : 8,161,696 B2
APPLICATION NO. : 13/283212
DATED : April 24, 2012
INVENTOR(S) : Ted D Colwell Page 1 of 1

It is certified that error appears in the above-identified patent and that said Letters Patent is hereby corrected as shown below:

Column 1
Line 7, after "now allowed" delete "now" and insert -- as --, therefor.

Column 12
Line 29, after "1/2" delete "A".

Column 13
Line 23 (Approx.), Delete " $3\tfrac{5}{8}\%$ " and insert -- $3\tfrac{5}{8}$ --, therefor.

Signed and Sealed this
Seventeenth Day of July, 2012

David J. Kappos
*Director of the United States Patent and Trademark Office*